(12) United States Patent
Billmers et al.

(10) Patent No.: US 6,846,502 B1
(45) Date of Patent: Jan. 25, 2005

US006846502B1

(54) EDIBLE HOT MELT COMPOSITION

(75) Inventors: Robert L. Billmers, Stockton, NJ (US); Bruce W. Asplund, Lake Hopatcong, NJ (US); David P. Huang, Bound Brook, NJ (US)

(73) Assignee: National Starch & Chemical Investment Holding Corporation, New Castle, DE (US)

( * ) Notice: Subject to any disclaimer, the term of this patent is extended or adjusted under 35 U.S.C. 154(b) by 1026 days.

(21) Appl. No.: 08/670,885

(22) Filed: Jun. 26, 1996

(51) Int. Cl.[7] .................................................. A23B 4/10
(52) U.S. Cl. ....................... 426/289; 426/293; 426/302; 426/578; 426/658
(58) Field of Search ............................... 426/658, 289, 426/293, 578, 302

(56) References Cited

U.S. PATENT DOCUMENTS

| | | | |
|---|---|---|---|
| 3,525,672 A | | 8/1970 | Wurzburg et al. ............ 195/31 |
| 4,293,572 A | * | 10/1981 | Silva et al. ................... 426/19 |
| 4,663,175 A | * | 5/1987 | Werner et al. .............. 426/289 |
| 4,738,865 A | * | 4/1988 | Morris ......................... 426/10 |
| 4,784,867 A | | 11/1988 | LaBaw et al. .............. 426/309 |
| 4,927,645 A | | 5/1990 | Lee ............................. 426/93 |
| 4,977,252 A | | 12/1990 | Chiu .......................... 536/102 |
| 4,981,707 A | * | 1/1991 | Morris ......................... 426/93 |
| 5,360,845 A | * | 11/1994 | Billmers et al. ............. 524/51 |
| 5,498,224 A | * | 3/1996 | Kauffamn et al. ........... 494/93 |
| 5,589,528 A | | 12/1996 | Bogardy ..................... 524/17 |
| 5,599,569 A | * | 2/1997 | Chiu et al. .................... 426/48 |
| 5,882,707 A | * | 3/1999 | Grillo et al. ................ 426/540 |

FOREIGN PATENT DOCUMENTS

| | | |
|---|---|---|
| EP | 0 118 240 | 9/1984 |
| EP | 0 511 916 A1 | 4/1992 |
| GB | 965349 | 7/1964 |
| JP | 57158276 | 3/1981 |
| JP | 57-166943 | 10/1982 |
| JP | 58108273 * | 6/1983 |
| JP | 61246239 | 4/1985 |
| JP | 61250080 | 4/1985 |
| JP | 3047040 | 7/1989 |
| JP | 6181691 | 7/1994 |
| RU | 530854 | 8/1976 |
| WO | 9222606 * | 12/1992 |

OTHER PUBLICATIONS

Butler, Robert W., "Film–forming coating compositions", (Hercules Inc.) *Def. Publ.*, U.S. Pat. Off., Chemical Abstracts, vol. 71, 1969, p. 73 (Abstract Only).

* cited by examiner

*Primary Examiner*—Lien Tran
(74) *Attorney, Agent, or Firm*—Karen G. Kaiser

(57) ABSTRACT

The instant invention is directed to a food grade, hot-melt adhesive which may be prepared by blending and melting a starch with a plasticizer and optionally adding a moisture resistant agent. Upon cooling, the solid mass can be aground into a free-flowing powder. The hot melt composition may then be used to apply any of a variety of particulate additives, such as flavoring and coloring agents, to food stuffs by the application of low heat.

18 Claims, No Drawings

EDIBLE HOT MELT COMPOSITION

BACKGROUND OF THE INVENTION

The present invention relates to a food grade, hot melt which contains a polysaccharide and a plasticizer and may be used to adhere particulate additives such as flavoring and/or coloring agents to foodstuffs. Hot melt, as used herein, pertains to thermoplastic materials useful as adhesives that are in the solid state at room temperature, but melt when the temperature rises.

There are many commercial applications wherein it is desired to adhere various particulate additives, for example flavoring agents such as sugar, salt, cheese powder, spices and the like to the external surfaces of foodstuffs, such as cereal, crackers, cookies, or snack foods such as potato chips, pretzels, tortilla chips, popcorn, or nut products.

It is desirable that the adhesive used add little or no flavor to the foodstuff. Further, the material must not only be readily applicable, but must be capable of providing strong adherence, even after the foodstuffs have been subjected to packaging, transport, and storage.

Fats and oils have traditionally been used for adhering particulate additives such as flavoring and/or coloring agents to these foodstuffs. However, as a result of recent market demand for low-fat and fat-free foodstuffs, these traditional adhesives often have been abandoned in favor of lower calorie substitutes.

These non-fat adhesives include gelatin, starch pastes, and malt syrups which have the disadvantage of decreasing adhesive forces over time such that the particulate additives tend to fall off prior to reaching the consumer or lack sufficient adhesive force such that they can only be used effectively in large quantities. Further, when using such water-based adhesives, it is necessary for the manufacturer to drive off the water after application so that the foodstuff does not absorb it and lose its crisp texture. This post-drying step not only requires additional processing time and equipment, but also introduces one more variable to control. Finally, traditional non-fat adhesives tend to be sticky due to their high ability to absorb moisture Recently, enzyme modified food starches have also been used as adhesives. For example, JP 56 49406 discloses the use of adhering flavoring agents to foods using a waxy starch hydrolyzed by α- and β-amylase.

Various other polysaccharide compositions are known in the art as being useful as adhesives, including those useful for adhering flavoring and/or coloring agents to foodstuffs. JP 61250080 discloses an adhesive tape or label in which pullulan is coated on one side of a releasing paper. JP 03047040 discloses an adhesive containing a polysaccharide, water, and ethanol. Chemical Abstract # 121:203917 discloses marshmallows coated with an edible adhesive material, such as gelatin, and powdered sugar. JP 61246239 discloses adhesive compositions useful for packaging which contain pullulan.

Surprisingly, it has now been discovered that an edible hot melt consisting of a starch and a plasticizer may be used for adhering various flavoring and/or coloring agents to foodstuffs.

Numerous hot melts are known in the art. Typically, these hot melts are inedible, substantially water insoluble, and used as packaging adhesives. However, several edible hot melts are known. For example, JP 57158276 discloses an edible hot melt adhesive composition containing an ethylene vinyl acetate copolymer, a tackifying resin, and a paraffin wax which is useful for the manufacture of vessels for storing edible oil-containing foods. Edible hot melts are also known for use as a protective coating for example US Defensive Publication 721,549 discloses edible hot meals containing solid monoglycerides, solid $C_2$–$C_4$ fatty acid acylated monoglycerides, or solid poly(oxyalkylene) glycerols with solid hydroxypropyl cellulose.

Although edible, none of these hot melt compositions disclose, or are even useful for, the present application of adhering particulate additives such as flavoring and/or coloring agents to foodstuffs, primarily as they are not free-flowing powders and/or do not have the ability to melt quickly at low temperatures.

SUMMARY OF THE INVENTION

The instant invention is directed to a food grade, hot-melt adhesive which may be prepared by blending and melting a starch with a plasticizer and optionally adding a moisture resistant agent. Upon cooling, the solid mass can be ground into a free-flowing powder. The hot melt composition may then be used to adhere any of a variety of particulate additives, such as flavoring and coloring agents, to foodstuffs by the application of low heat.

The hot-melt described herein will find many applications in the food industry, but will be particularly useful in the preparation of low calorie snacks.

An object of the instant invention is to provide an edible hot melt which is useful for adhering particulate additives to foodstuffs.

Another object of the instant invention is to provide a method of adhering particulate additives to foodstuffs wherein it is not necessary for the manufacturer to drive off the water added using traditional food adhesives.

A further object of the instant invention is to provide an edible hot melt which remains a substantially free flowing, powder at ambient conditions, but melts quickly upon the application of heat.

These and other objects of the present invention will become apparent to one skilled in the art from the following detailed description and examples below.

DETAILED DESCRIPTION OF THE INVENTION

The instant invention is directed to a food grade, hot-melt adhesive which may be prepared by blending and melting a starch with a plasticizer. Upon cooling, the solid mass can be ground into a free-flowing powder, i.e. one that will resist agglomeration or fusion. A moisture resistant agent may optionally be included to minimize moisture absorption even at high relative humidity. The hot melt composition may then be used to adhere any of a variety of particulate additives, such as flavoring and coloring agents, to foodstuffs by the application of low heat.

The starch to be used in the instant invention may include any cereal or root starch or flour. Examples of suitable materials include, but are not limited to, maize, rice, barley, wheat, sorghum, tapioca, potato, the waxy versions thereof, and the corresponding flours, particularly waxy starches, more particularly waxy corn starch. Converted, i.e., acid treated starches or chemically modified starches may also be used as the starting materials.

The molecular weight of the instant starch is generally reduced to facilitate melting of the starch in the overall formulation such that the hot melt composition has a viscosity of from about 10,000 to about 400,000, particularly from about 50,000 to about 250,000, most particularly from about 50,000 to about 100,000, cps at application temperature, that is at approximately 200–300° F. The viscosity of the hot melt composition will depend not only upon the type and amount of starch used, but also upon the type and amount of the plasticizer and, when present, the moisture resistant agent.

Any method may be used to reduce the molecular weight of the starch including, but not limited to, chemical hydrolysis by the addition of acid or base, enzymatic hydrolysis by the addition of at least one enzymes or dextrinization by the addition of heat. Starches in which repolymerization occurs after dextrinization may, also be used.

The starch may also be chemically modified, including, esterification or etherification using known methods. If both modification and reduction of molecular weight of the starch are used, they may be accomplished in any order except when the derivative is labile.

In particular, corn syrup solids, maltodextrins and amylase-treated starches are used as the starch component of the present invention. Maltodextrins with a dextrose equivalent of less than about 20 are preferred over other maltodextrins. Dextrose equivalent, as used herein, is defined as the reducing power of the hydrolysate. As each starch molecule has one reducing end, DE is inversely related to molecular weight. The DE of anhydrous D-glucose is defined as 100 and the DE of unhydrolyzed starch is virtually zero.

Amylase-treated starches which are first steam cooked, particularly jet cooked, and then converted by a single enzyme, particularly α-amylase, β-amylase, or glucoamylase, to a DE of from about 2 to about 40 and a funnel viscosity of from about 7 to about 80 seconds, are preferred over other amylase-treated starches.

Jet cooking, as used herein, refers to slurring the starch and heating the slurry to a temperature of from about 120° C. to about 170° C., in order to gelatinize substantially all of the starch. The steam cooking is generally carried out on a starch slurry at a solids level of from about 10 to about 40%, particularly from about 20 to about 25% and a pH from about 4 to about 7, particularly from about 4.5 to about 5.5, with a pressure greater than 60 psi in the cooking chamber.

The enzymatic conversion is carried out using techniques known in the art and described, for example, in U.S. Pat. No. 3,525,672 to Wurzburg, and U.S. Pat. No. 4,977,252 to Chiu. Generally the enzyme treatment is carried out at a starch concentration level of about 10 to about 40%, particularly from about 20 to about 2500, depending upon the base starch used. The enzyme reaction is continued until the starch is sufficiently degraded to provide a viscosity of from about 7 to about 80 seconds, particularly from about 16 to about 60 seconds, measured at 19% w/w solid concentration at room temperature using a standard funnel method. The resultant product is further characterized by a dextrose equivalent (DE) of 2 to 40.

Funnel viscosity, as used herein, is determined by the following procedure. The starch dispersion to be tested is adjusted to 19% (w/w) measured by refractometer. The temperature of the dispersion is controlled at 22° C. A total of 100 ml of the starch dispersion is measured into a graduated cylinder. It is then poured into a calibrated funnel while using a finger to close the orifice. A small amount is allowed to flow into the graduate to remove any trapped air and the balance is poured back into the funnel. The graduated cylinder in then inverted over the funnel so that the contents draw (flow) into the funnel while the sample is running. Using a timer, the time required for the 100 ml sample to flow through the apex of the funnel is recorded.

The glass portion of the National Starch BF Funnel is a standard 58°, thick-wall, non-fluted, resistance glass funnel in which the top opening diameter is about 9 to about 10 cm with the inside diameter of the stem being about 0.381 cm. The glass stem of the funnel is cut to an approximate length of 2.86 cm from the apex, carefully fire-polished, and refitted with a long stainless steel tip which is about 5.08 cm long with an outside diameter of about 0.9525 cm. The interior diameter of the steel lip is about 0.5952 cm at the upper end where is attached to the glass stem and about 0.4445 cm at the outflow end with the restriction in the width occurring at about 2.54 cm from the ends. The steel tip is attached to the glass funnel by means of a Teflon tube. The funnel is calibrated so as to allow 100 ml of water to go through in six seconds using the above procedure.

Generally, the enzyme conversion will be carried out for a time period ranging from half an hour to 24 hours or more depending upon the temperature of the reaction, the type and concentration of enzyme used, and the starch concentration and viscosity of the reaction slurry. The enzyme reaction is terminated by raising the temperature to about 85° C. and maintaining that temperature for about ten minutes to fully deactivate the enzyme. Acid deactivation, as known in the art, can also be employed to deactivate the enzyme. The amylase-treated starch is then recovered in powdered form by conventional techniques, such as drum-drying or spray-drying.

The starch may be a single starch or a combination of starches. It is present in an amount from about 10 to about 70, particularly from about 20 to about 40, most particularly from about 20 to about 30, percent by weight of the starch/plasticizer mixture.

The instant plasticizer may be any edible plasticizer or a combination of edible plasticizers, particularly a polyhydroxide such as a polyol or a polyacetic acid. The choice of plasticizer will substantially determine the melting temperature and the molten viscosity of the hot melt composition. In particular, a polyol of lower viscosity will result in better adhesion and a solid polyol will generally provide better resistance to moisture absorption. Plasticizers useful in the instant invention include, but are not limited to, sorbitol, mannitol, maltitol, lactitol, fructose, glucose, glycerin, sucrose, high fructose corn syrups, citric acid, and ascorbic acid, particularly fructose. Although a low melting, point temperature polyol is preferred, the starch tends to depress this temperature so that the resultant hot melt composition generally has a lower melting point temperature than the pure plasticizer.

The plasticizer is present in an amount from about 30 to about 90, particularly from about 50 to about 80, most particularly from about 60 to about 80, percent by weight of the starch/plasticizer mixture.

The instant hot-melt adhesive may be prepared by blending and then melting the starch with the plasticizer using conventional methods known in the art such that the starch is substantially dispersed within the plasticizer. After cooling, the solid mass can be reduced to a free-flowing powder, particularly of a maximum particle size of less than about a 60 mesh (250 μm), particularly from about 100 to about 200 mesh (from about 149 μm to about 74 μm) by any method known in the art, such as grinding.

It is preferred to limit the amount of Water in the final hot melt composition to as close to zero as possible. A composition which does not contain water is generally easier to apply to the foodstuff and results in a smoother, more uniform coverage. Thus, in one embodiment, an edible composition is added to increase moisture resistance and reduce water absorption at elevated relative humidity, herein referred to as a moisture resistant agent. Such hot melt compositions tend to remain free-flowing, powders for longer time periods under a variety of ambient conditions, including high relative humidity.

The moisture resistant agent may be initially mixed in with the starch and plasticizer or may be added after melting the starch/plasticizer mixture. When added in such manner, it is preferable that the reducing of the composition to a free-flowing powder be accomplished in a manner which does not generate significant heat. In the alternative, the free-flowing hot melt powder may be at least partially coated with the moisture resistant agent using any technique known in the art, such as by using a Wurster coater (manufactured by Glatt Air Techniques, Inc.).

The moisture resistant agent may be an edible wax, fat, or protein such as gelatin, particularly a wax, more particularly a wax that is not sticky at room temperature and will not fuse or clump at temperatures below its melting point Waxes suitable for use in the instant invention include, but are not limited to, candelilla, carnauba, beeswax, stearin, paraffin, and stearic acid, particularly carnauba.

The moisture resistant agent may be a single agent or a combination of agents and is present in an amount from 0 to about 30, particularly from about 5 to about 20, percent by weight of the total hot melt composition.

Dextrins, particularly low molecular weight dextrins, may be added to lower the viscosity of the hot melt composition and to help keep it free-flowing. Dextrins are is particularly useful when added in the range of from approximately 5 to approximately 20% by weight.

Minor amounts of other additives known in the art may be added to the hot melt composition. For example, a liquid polyol, particularly glycerol, may be added to further aid in melting of the hot melt composition and destructuring of the starch and flow aids such as corn starch or high amylose starch may be added.

The resultant hot melt composition will generally be a non-sticky, hard, and brittle substance upon cooling which facilitates grinding into a free-flowing, moisture resistant powder.

The hot melt composition will be capable of melting it a lows temperature, i.e. from about 200° F. to about 300° F., in less than about two minutes, particularly in less than about thirty (30) seconds. Upon melting, the composition will be sufficiently fluid to adhere the particulate additives to the foodstuff, but will set within a few seconds upon cooling.

The melted hot melt composition will be sticky and nonvolatile (100% solids). It will generally have a viscosity of from about 10,000 to about 400,000, particularly from about 50,000 to about 250,000, most particularly from about 50,000 to about 100,000, cps at application temperature.

The edible hot-melt described herein will find many applications in the food industry, but will be particularly useful in the preparation of low calorie snacks. The hot melt composition may be used to adhere any of a variety of particulate additives, such as flavoring and coloring agents, to foodstuffs by the application of low heat.

An adhesive-effective amount, particularly 10–50% by weight of the coating (hot melt composition plus particulate additive) of the dry, substantially free-flowing hot melt composition can be mixed with various particulate additives, such as flavoring and/or coloring agents. The resultant hot melt/particulate mixture can then be applied to foodstuffs.

The application may be to a hot food such as one directly out of the oven of deep-fryer, in which case the hot melt composition will melt, adhering the particulate additives such as flavoring and/or coloring agents to the foodstuff. In another embodiment, the application of the hot melt/ particulate mixture may be to a colder food in which case it may be necessary to apply heat, such as by hot air, microwave, ultraviolet light or infrared light, to melt the hot melt composition and adhere the particulate additive to the foodstuff. In a third embodiment, the hot melt/particulate mixture may be melted prior to application.

In the alternative, the hot melt composition may be applied separately from the particulate additive. In this alternative, the application may be to a hot food such as one directly out of the oven or deep-fryer, in which case the hot melt composition will melt and then the particulate additive is added, adhering to the foodstuff. In another embodiment, the application of the hot melt composition may be to a colder food in which case it may be necessary to apply heat, such as by hot air, microwave, ultraviolet light or infrared lighting, to melt the hot melt composition and then the particulate additive is added, adhering to the foodstuff. In a further embodiment, the hot melt composition may be melted prior to application and after it is applied to the foodstuff, the particulate additive is added and thus adhered.

Flavoring agents include, but are not limited to, salt, cheese powder, sugar, caramel flavoring, chili, Cajun spice, ranch seasonings and sour cream and onion flavoring Foods, as used herein, refers to any edible food and includes but is not limited to cereals, biscuits such as crackers and cookies, and snack foods such as pretzels, potato chips, corn chips, popcorn, and peanuts.

EXAMPLES

The following examples are presented to further illustrate and explain the present invention and should not be taken as limiting in any regard.

Example 1

A total of 70 grams of fructose was dry blended with 30 grams of anhydrous N-TACK™ (a corn syrup solid made by National Starch and Chemical). A Brabender PL-2000 Plasticorder was fitted with a three-piece electrically-heated 100 ml mixing bowl equipped with sigma blades and preheated to 140° C. The dry blend was fed into the mixing bowl over about 1 minute and allowed to blend for 30 minutes until a uniform melt was achieved. Ten grams of Carnauba wax was added to the mixer and allowed to mix for an additional 10 minutes. The contents were then removed, cooled to room temperature and ground into a fine powder.

Example 2

A dry blend of 700 grams of fructose, 300 grams anhydrous N-TACK and 100 grams of powdered carnauba wax was prepared in a Paterson-Kelly V-form blender. A Brabender PL-2000 Plasticorder equipped with a conical twill-screw extruder and mixing screw were heated from 120° C. (first zone) to 150° C. die body. The die was a 1/16 in rod die. The blend was starve fed into the extruder at a rate of about 4 kg/1 hr and collected at the end in silicon release containers. Once the product had cooled, it was ground into a fine powder.

Example 3

A total of 70 grams of fructose was dry blended to 30 grams of anhydrous N-TACK (a maltodextrin made by National Starch & Chemical) and 10 grams of glycerol. A Brabender PL-2000 Plasticorder was fitted with a 3-piece electrically-heated 100 ml mixing bowl equipped with sigma blades and preheated to 140° C. The dry blend was fed into the mixing bowl over about 1 minute and allowed to blend for 30 minutes until a uniform melt was achieved. Ten grams of Carnauba wax was added to the mixer and allowed to mix for an additional 10 minutes. The contents were then removed, cooled to room temperature and ground into a fine powder

Example 4

A dry blend of 70 grams of fructose, 15 crams anhydrous N-TACK, 15 grams Nadex 772 (a dextrin manufactured by National Starch and Chemical Company), and 20 grams of powdered carnauba wax was prepared in a Paterson-Kelly V-form blender. A Brabender PL-2000 Plasticorder equipped with a conical twin-screw extruder and mixing screw were heated from 120° C. (first zone) to 150° C. die body. The die was a 1/16 in rod die. The blend was starve fed into the extruder at a rate of about 4 kg/hr and collected at the end in silicon release containers. Once the product had cooled, it was ground into a fine powder.

Example 5

The dry free flowing powder from example 2 was nixed with ranch seasonings in the ratios listed in Table 1. The mixture was sprinkled onto tortilla chips and heated with hot air to approximately 25° F. The amounts of seasoning which adhered to the chips are listed in Table 1. This example shows the utility of food grade hot melts for adhesion of particulate additives such as flavoring and coloring agents to various food substrates.

TABLE I

| % Adhesive | % Seasoning | Temperature (° F.) | Time (sec) | % Adhesion |
|---|---|---|---|---|
| 10 | 90 | 250 | 10 | 45 |
| 25 | 75 | 250 | 10 | 67 |
| 50 | 50 | 250 | 10 | 83 |

Example 6

Hot melt compositions were prepared as follows. The starch, plasticizer, and water resistant agent were mixed in a Paterson-Kelly V-form blender. A Brabender PL-2000 Plasticorder equipped with a conical twill-screw extruder and mixing screw was heated from 120° C. (first zone) to 150° C. die body. The die was a 1/16 in rod die. The blend was starve fed into the extruder at a rate of about 4 kg/hr aid collected at the end in silicon release containers. Once the product had cooled, it was ground into a fine powder.

The dry free flowing powder was sprinkled onto tortilla chips and heated with hot air to approximately 250° F. The times to melt are listed in Table 11 The starches used are all manufactured by National Starch and Chemical Company: Amioca 85, a fluidity starch; Corn 73, a fluidity starch: Nadex 320, a dextrin, Nadex 360, a dextrin; Nadex 772, a dextrin; and Purity Gum 59, a chemically modified food starch.

This example shows that a variety of starches, plasticizers, and moisture resistant agents may be used to prepare a food grade hot melt for adhesion of particulate additives, such as flavoring and coloring agents, to various food substrates.

TABLE II

| | STARCH | PLASTICIZER | MOISTURE RESISTANT AGENT | TIME TO MELT |
|---|---|---|---|---|
| a) | 90 g Nadex 320 | 10 g glycerol | none | 3 min |
| b) | 70 g Nadex 320 | 30 g glycerol | none | 3 min |
| c) | 70 g Nadex 360 | 30 g glycerol | none | 3 min |
| d) | 50 g N-TACK | 50 g maltose | none | 3 min |
| e) | 50 g N-TACK | 50 g glucose | none | 4 min |
| f) | 49 g N-TACK | 50 g sucrose/ 1 g glycerol | none | 4 min |
| g) | 30 g Amioca 85 | 70 g fructose | none | 45 sec |
| h) | 30 g corn 73 | 70 g fructose | none | 2.5 min |
| i) | 30 g Nadex 320 | 70 g fructose | none | 60 sec |
| j) | 30 g Nadex 772 | 70 g fructose | none | 3 min |
| k) | 30 g Purity Gum 59 | 70 g fructose | none | 180 sec |
| l) | 30 g Short-chain Crystalline Amylose | 70 g fructose | none | 45 sec |
| m) | 25 g N-TACK | 65 g fructose | 10 g paraffin wax | 30–45 sec |
| n) | 25 g N-TACK | 65 g fructose | 10 g stearic acid | 30–45 sec |
| o) | 40 g N-TACK | 50 g fructose | 20 g gelatin | 5 min |
| p) | 25 g N-TACK | 70 g fructose | 5 g candelilla wax | 30 sec |
| q) | 25 g N-TACK | 70 g fructose | 5 g beeswax | 30 sec |
| r) | 20 g N-TACK | 70 g fructose | 10 g stearine | 20 sec |

What is claimed is:

1. A hot melt composition comprising a starch, a plasticizer selected from the group consisting of a polyol and a polyacetic acid and essentially no water, the starch being present in an amount of from about 20% to about 30% by weight of the starch/plasticizer mixer, wherein the hot melt is food-grade.

2. The composition of claim 1, wherein the starch is selected from the group consisting of maltodextrins having a DE value of less tan about 20, amylase-treated starches, and corn syrup solids.

3. The composition of claim 1, wherein the starch is corn syrup solids.

4. The composition of claim 1, wherein the plasticizer is selected from the group consisting of sorbitol, mannitol, maltitol, lactitol, fructose, glucose, glycerin, sucrose, high fructose corn syrups, citric acid, and ascorbic acid.

5. The composition of claim 1 father comprising a moisture resistant agent.

6. The composition of claim 5, wherein the moisture resistant agent is selected from the group consisting of a wax, a fat, and a protein.

7. The composition of claim 6, wherein the moisture resistant agent is selected from the group consisting of candelilla wax, carnauba wax, beeswax, stearin, paraffin, and stearic acid.

8. The composition of claim 5, wherein the starch is an enzyme modified, waxy corn starch, the plasticizer is fructose, and the moisture resistant agent is carnauba wax.

9. The composition of claim 5, wherein the starch is an enzyme modified, waxy corn starch, the plasticizer is fructose, and the moisture resistant agent is stearine.

10. The composition of claim 5 further comprising a dextrin.

11. A foodstuff comprising the hot melt composition of claim 1 and at least one particulate additive.

12. The foodstuff of claim 11 further comprising a moisture resistant agent.

13. The foodstuff of claim 11, wherein the particulate additive is a flavoring and/or a coloring agent.

14. The composition of claim 1 further comprising a carnuba wax.

15. The composition of claim 1 further comprising stearin.

16. The composition of claim 1 further comprising candelilla wax.

17. The composition of claim 1, wherein the plasticizer is fructose.

18. The composition of claim 17 further comprising a moisture resistant agent.

* * * * *